United States Patent

Pardee et al.

[11] Patent Number: 5,349,833
[45] Date of Patent: Sep. 27, 1994

[54] CRYOTRAP FOR AIR POLLUTION ANALYZER

[75] Inventors: Michael A. Pardee, Saugus; Matthias J. C. Yoong, Ventura, both of Calif.

[73] Assignee: Xontech, Inc., Van Nuys, Calif.

[21] Appl. No.: 20,981

[22] Filed: Feb. 22, 1993

[51] Int. Cl.⁵ .............................................. B01D 8/00
[52] U.S. Cl. .................................... 62/55.5; 73/863.11
[58] Field of Search ........................ 62/55.5; 73/863.11

[56] References Cited

U.S. PATENT DOCUMENTS

| | | |
|---|---|---|
| 2,880,615 | 4/1959 | Hardy et al. . |
| 3,485,054 | 12/1969 | Hogan .................... 62/55.5 |
| 3,611,812 | 10/1971 | Cleveland . |
| 3,673,871 | 7/1972 | Randle et al. . |
| 3,712,074 | 1/1973 | Boissin .................... 62/55.5 |
| 3,881,359 | 5/1975 | Culbertson . |
| 4,148,196 | 4/1979 | French et al. ............ 62/55.5 |
| 4,154,088 | 5/1979 | Werner . |
| 4,283,948 | 8/1981 | Longsworth ............ 62/55.5 X |
| 4,425,811 | 1/1984 | Chatzipetros et al. ... 62/55.5 X |
| 4,479,927 | 10/1984 | Gelernt ................ 62/55.5 X |
| 4,506,513 | 3/1985 | Max . |
| 4,607,491 | 8/1986 | Ishumuru et al. ........ 62/55.5 |
| 4,677,863 | 7/1987 | Gay et al. ............ 62/55.5 X |
| 4,964,278 | 10/1990 | Wen et al. . |
| 4,977,749 | 12/1990 | Sercel . |
| 5,073,896 | 12/1991 | Reid et al. ............ 62/55.5 X |

Primary Examiner—Henry A. Bennett
Assistant Examiner—Christopher Kilner
Attorney, Agent, or Firm—Harris, Wallen MacDermott & Tinsley

[57] ABSTRACT

A cryotrap for an air pollution analyzer having a core with an axial opening for receiving a cooling gas expander, a length of tubing carried on the core defining a gas flow path around the gas expander, and an electric heater on the core, with the tubing disposed between the heater and expander. The core has a helical groove around the exterior thereof, with the length of tubing positioned in the groove, and the heater positioned around the core over the tubing. A Stirling linear drive cooler charged with helium and having a gas compressor connected to one end of the gas expander with the other end of the expander positioned in the axial opening of the core.

13 Claims, 3 Drawing Sheets

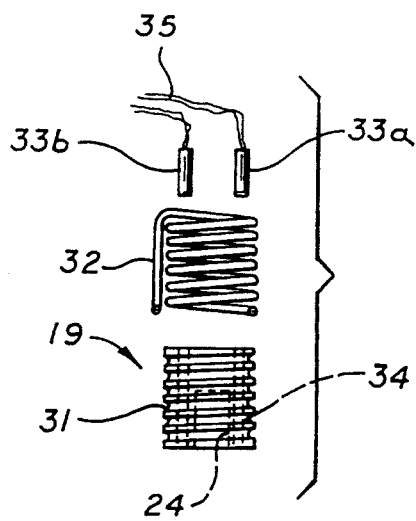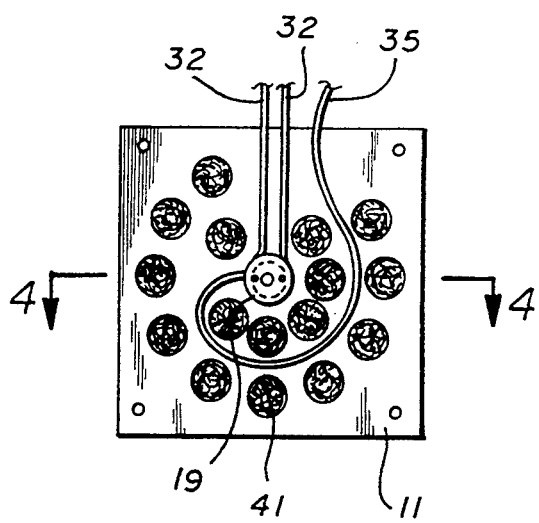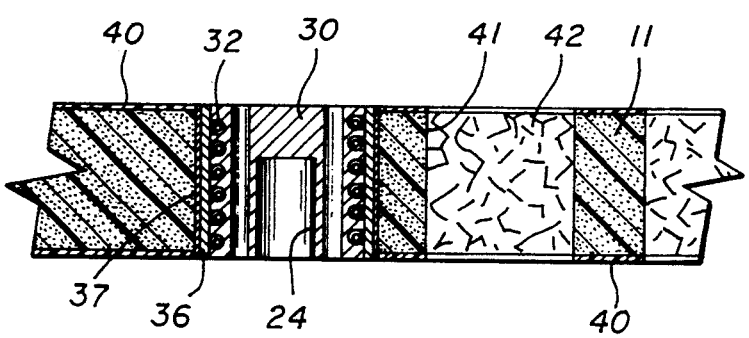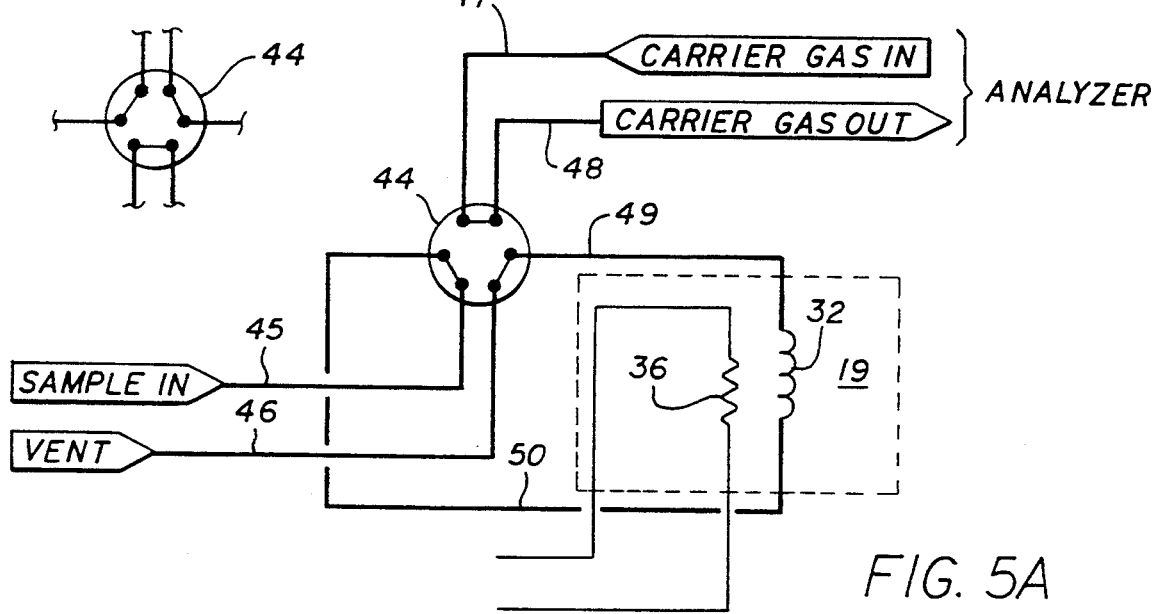

CRYOTRAP FOR AIR POLLUTION ANALYZER

BACKGROUND OF THE INVENTION

This invention relates to air pollution analyzers and the like which measure constituents in a sample gas stream. More particularly, the invention relates to a cryotrap used for extracting constituents from the sample gas.

In a typical air pollution application, the air sample is passed through a cryotrap which is maintained at the temperature of liquid nitrogen or other liquid cryogens. Constituents in the gas sample are frozen by the low temperature and solidify on the cold surfaces of the trap. After the desired amount of sample gas has passed through the trap, the gas flow path is changed so as to pass a carrier gas through the trap in place of the sample gas. At this time, the trap is heated. The frozen constituents vaporize and are carried away with the carrier gas to an analyzer or other instrument. The now clean trap is ready for another sampling and flushing cycle.

In the cryotraps commonly used, liquid nitrogen is the gas chosen for the freezing step. However, the liquid nitrogen is lost to the atmosphere and a new quantity must be utilized for each operation. For instruments which operate continuously, the cost of liquid nitrogen as the freezing gas is very high.

It is an object of the present invention to provide a new and improved cryotrap which uses a closed cycle cooler for the freezing with no coolant being discharged after each sampling cycle.

A further object of the invention is to provide such a cryotrap with a new and improved construction for obtaining increased efficiency in cooling and heating while enabling a smaller construction and shorter operating cycles.

Earlier mechanical coolers are bulky, heavy, noisy, and have high mechanical vibration. They have relatively short life cycles and do not cool to liquid nitrogen temperature. It is an object of the present invention to use a Stirling closed cycle linear cooler which is relatively lightweight and compact. Features of the Stirling cooler include low conducted and radiated emissions, low mechanical vibration, acoustically quiet operation, and improved lifetime and reliability.

Other objects, advantages, features and results will more fully appear in the course of the following description.

SUMMARY OF THE INVENTION

The cryotrap of the invention includes a core having first means for receiving a cooling gas expander, a length of tubing carried on the core defining a gas flow path around the gas expander, and an electric heater on the core, with the tubing disposed between the heater and expander. The core preferably has a helical groove around the exterior thereof, with the tubing positioned in the groove, and with the heater positioned around the core over the tubing. The core may be a cylindrical copper rod with a helical groove on the exterior with the tubing wound therein, and an axial opening for the gas expander, and including a copper foil wrapped around the core over the heater.

The source of cooling may comprise a Stirling linear drive cooler charged with helium and having a gas compressor connected to one end of the gas expander with the other end of the expander positioned in the core.

Insulation for the cryotrap preferably includes a support for the core having a first central plate and a plurality of second insulator plates, with at least one second plate on each side of the first plate, and with the core positioned in the first plate. Each of the first and second plates is of a low density, closed cell, rigid foam thermal insulation with a plurality of openings therethrough, and metalized plastic film on each side of the plate, and includes crumpled metalized plastic film filling the openings of the second plate. A plurality of third insulator plates may be used with at least one third plate on each side of the first and second plate combination, and a fourth mounting plate on a side of the first, second and third plate combination with the plates joined in a sandwich construction.

BRIEF DESCRIPTION OF THE DRAWINGS

FIG. 2 is an enlarged and exploded view of the core and coil of the cryotrap of FIG. 1;

FIG. 3 is a side view of the core plate of FIG. 1;

FIG. 4 is an enlarged sectional view taken along the line 4—4 of FIG. 3;

FIG. 5A is a diagram illustrating the operation of the cryotrap, with the control valve in the sampling position; and FIG. 5B is a diagram similar to that of FIG. 5A with the control valve in the flushing position.

DESCRIPTION OF THE PREFERRED EMBODIMENT

Figure 1:
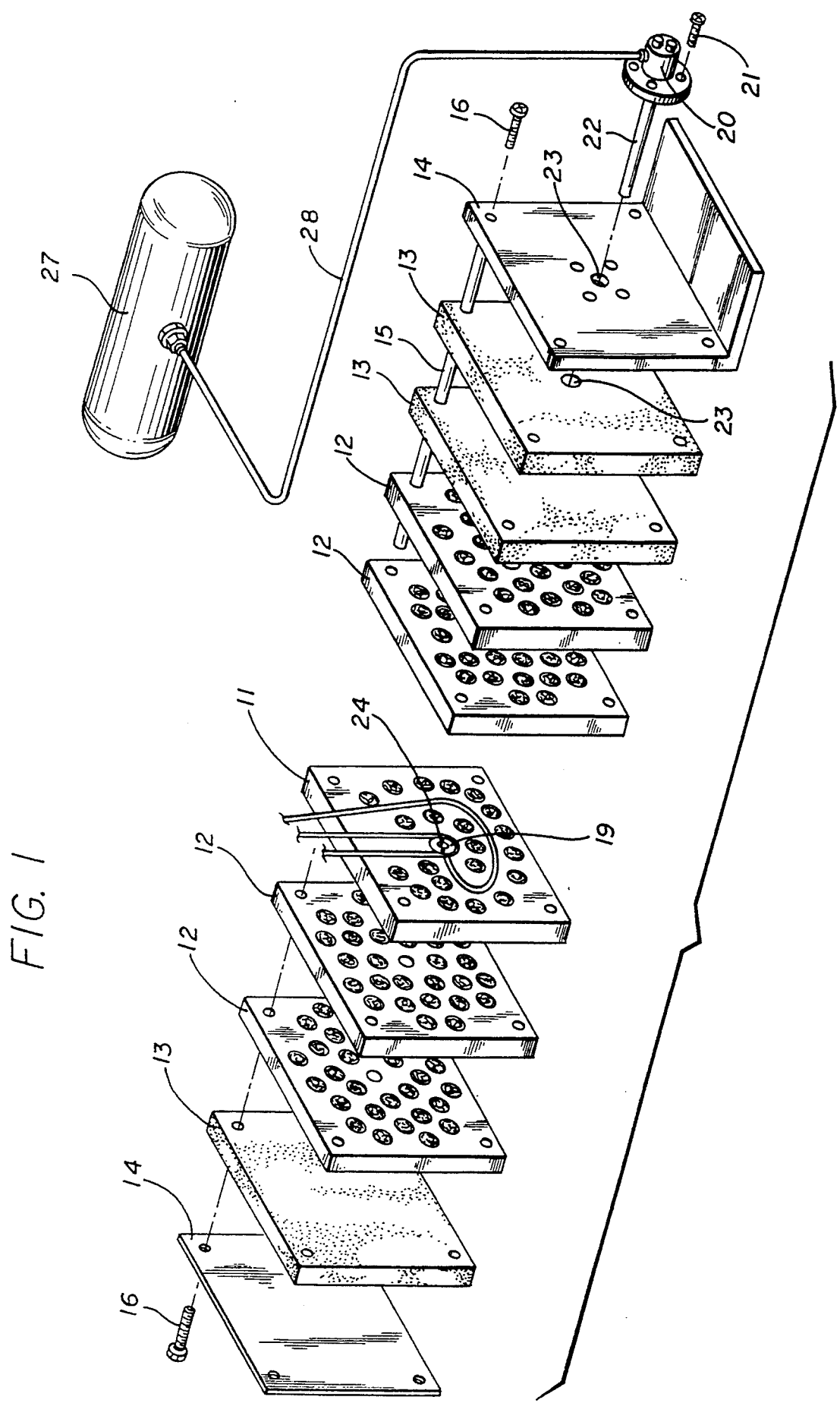
FIG. 1 is an exploded view of a cryotrap incorporating the presently preferred embodiment of the invention.

In the cryotrap shown in FIG. 1, a core plate 11, apertured insulator plates 12, solid insulator plates 13, and a mounting plate 14 are held together in a sandwich construction by rods 15 and screws 16 positioned at the corners of the plates. A core 19 is positioned in the core plate 11 and a gas expander 20 is attached to the mounting plate 14 by screws 21, with the tube 22 of the gas expander extending through openings 23 in the plates and into an axial opening 24 in the core 19. A thermally conductive compound such as silver-loaded silicone grease may be applied to the end of the expander tube 22 to improve the thermal connection to the core 19.

The gas expander is part of a refrigeration system which provides for cooling of the core 19. In the preferred embodiment illustrated, a Stirling linear cooler is utilized, having a compressor 27 connected to the gas expander by a line 28. The Stirling linear cooler may be of conventional design, providing a closed cycle with helium being compressed at the compressor and with pressure pulses transferred through the helium to the expander. Cooling is obtained by cyclic out-of-phase motion of a compression piston and a displacer-regenerator located in the expander assembly.

The compressor is operated for a time prior to the introduction of the sample to allow the core and tubing to reach the desired operating temperature. The compressor continues to operate during the time that the sample is passed through the trap tubing. The compressor is then turned off during the heating mode.

Figure 6:
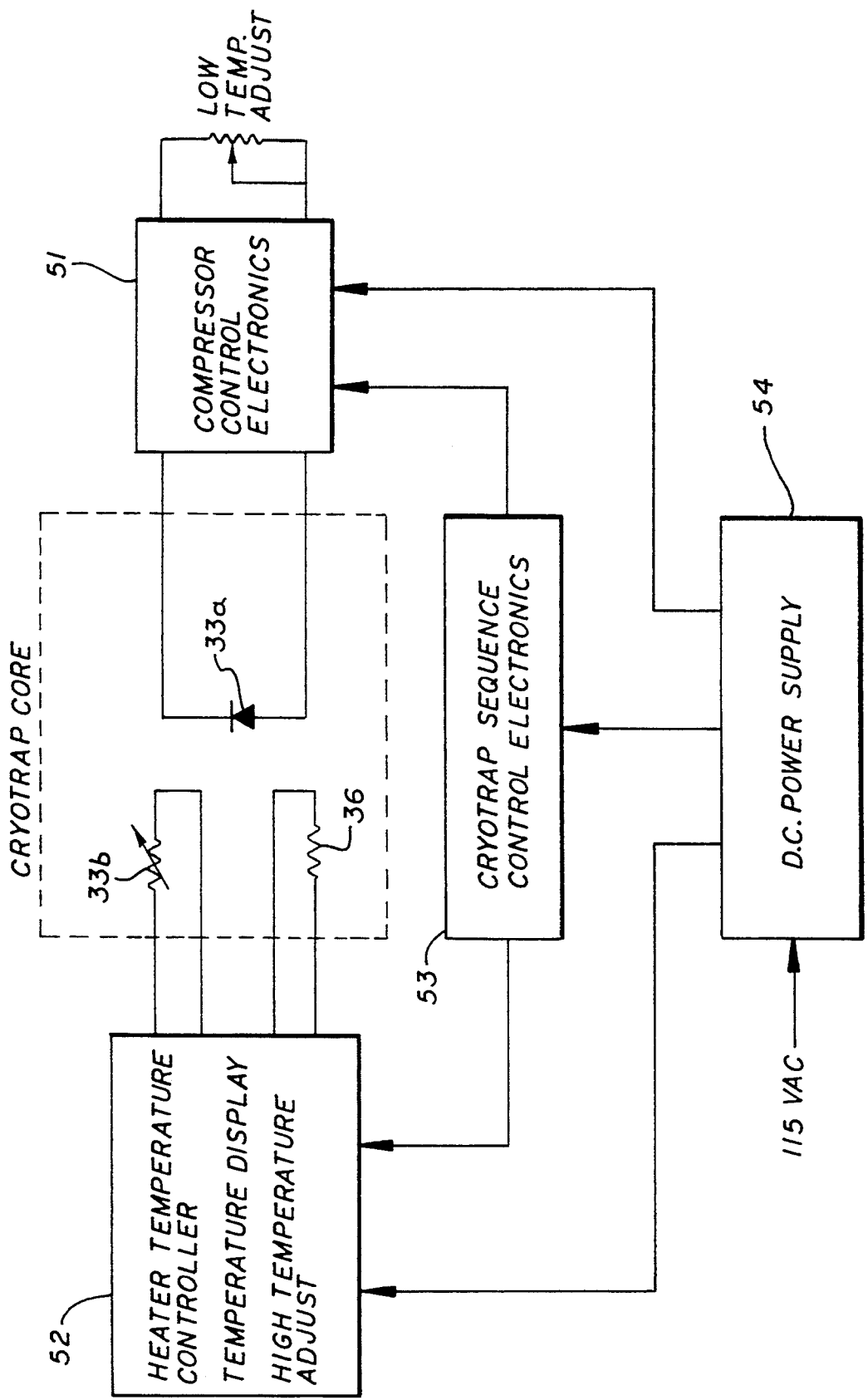
FIG. 6 is an electrical block diagram for the cryotrap.

The preferred construction for the core and the plates is shown in greater detail in FIGS. 2-4. The core 19 preferably is a copper cylinder 30 with a helical groove 31 on the exterior. A length of tubing 32, preferably of stainless steel, is wound on the core in the helical groove. Temperature sensors 33a, 33b may be positioned in openings 34 in the core, preferably between the gas expander opening 24 and the helical groove B1. The temperature sensors are connected to a control circuit as shown in FIG. 6 by wires 35.

A flexible heater 36 is placed on the core over the tubing and typically is a Kapton film heater consisting of a resistive metallic foil heater element insulated on both sides by a thin film of Kapton polyimide. A layer of aluminum foil is bonded to the back of the heater to distribute the heat evenly and a layer of pressure sensitive adhesive is applied to the aluminum. The pressure sensitive adhesive serves to temporarily hold the heater to the core. Copper foils with a pressure sensitive adhesive on one side are then wrapped around the heater and core and soldered in place. The copper foil serves to hold the heater in place.

During the cooling mode the compressor control electronics hold the core temperature to a selectable preset temperature as sensed by the temperature sensor 33a. During the heating mode the heater temperature controller 52 holds the core temperature to a selectable preset temperature as sensed by the temperature sensor 33b. The heater temperature controller also provides a display of the core temperature. Cooling and heating modes are controlled by the cryotrap sequence control electronics 53, with power from adc power supply 54.

Desirably, the core plate 11 and insulator plates 12, 13 are formed of a low density, closed cell, rigid foam for thermal insulation, typically a polymethacrylimide foam. The individual plates preferably are about ½" thick and about 4"×4" square. A layer of moralized plastic film 40, typically aluminized Mylar film, is positioned on each side of each plate, typically about 0.0005" thick.

A plurality of openings 41 are provided in each of the core plate and insulator plates, typically about ½" in diameter. Prior to applying the surface layers 40, the openings preferably are filled with crumpled metalized plastic film 42, typically aluminized Mylar film. Also, preferably the openings 41 in adjacent plates are misaligned, as seen in FIG. 1.

In operation, the core is cooled by the gas expander rod 22 in the opening 24 of the core. Substantial insulation is provided around the core and the gas expander tube so there is minimal heating from the surrounding atmosphere. At the same time, heat is periodically applied to the tubing for thawing the frozen gas constituents. Hence, good heat transmission between the heater and the tubing is desired. It has been found that the insulation construction using the foam plates, with the crumpled metalized film in the openings 41 achieves an excellent balance between heating and cooling, permitting freezing of substantially all constituents in the gas while at the same time requiring a minimum of cooling energy and permitting a rapid cycle time.

It is desirable to cool the core quickly. Rapid cooling minimizes wear on the Stirling cooler and enables the cryotrap to complete a cooling/heating cycle quickly. To cool the core quickly it is necessary to minimize the amount of material that must be cooled. This includes the insulating material around the core, therefore insulating material is removed resulting in a plurality of openings 41 in each of the core plates and insulator plates. The openings are typically ½" in diameter leaving a "web" of foam insulation to support the core and providing a longer path through the foam from the core to the outside. To prevent air currents from circulating in these openings, the openings are filled with crumpled metalized plastic film 42, typically aluminized Mylar film. Metalized plastic film is also bonded to each side of the insulating plate. The metalized plastic film also serves to reflect external radiant energy away from the core.

The cryotrap is utilized with a six port valve 44 which is movable between a sampling position shown in FIG. 5A and a flushing position shown in FIG. 5B. A source of sample gas is connected to the valve through a line 45, and a vent for the sample gas is connected to the valve through another line 46. The carrier gas from an analyzer such as a gas chromatograph is connected to the valve by an incoming line 47 and an outgoing line 48. The tubing 32 is connected to the valve 44 by lines 49, 50.

During the sampling mode, the sample gas flows through the line 45, the valve 44, through the tubing 32, and back through the valve to the vent line 46, with the carrier gas flowing directly to and from the valve through lines 47, 48.

With the valve turned to the flushing mode, the sample gas flows directly into and out of the valve, with the carrier gas flowing through the line 47 to the valve, through the tubing 32 and back to the analyzer through the valve and the line 48.

The operation of the valve may be automatic, operating on a predetermined cycle or may be manually operated as desired.

We claim:

1. In a cryotrap for an air pollution analyzer, the combination of:
   a core having first means for receiving a cooling gas expander;
   a length of tubing carried on said core defining a gas flow path around said gas expander; and
   an electric heater on said core, with said tubing disposed between said heater and expander;
   said core having a helical groove around the exterior thereof, with said length of tubing positioned in said groove, and with said heater positioned around said core over said tubing.

2. A cryotrap as defined in claim 1 wherein said core is a cylindrical copper rod with a helical groove around the exterior with said tubing wound therein, with an axial opening for said gas expander, and including a copper foil wrapped around said core over said heater.

3. A cryotrap as defined in claim 2 including a second opening in said core between said axial opening and said helical groove for receiving a temperature sensor.

4. A cryotrap as defined in claim 1 including a Stirling linear drive cooler charged with helium and having a gas compressor connected to one end of said gas expander with the other end of said expander positioned in said core.

5. In a cryotrap for an air pollution analyzer, the combination of:
   a core having first means for receiving a cooling gas expander;
   a length of tubing carried on said core defining a gas flow path around said gas expander;
   an electric heater on said core, with said tubing disposed between said heater and expander; and
   a support for said core having a first central plate and a plurality of second insulator plates, with at least one second plate on each side of said first plate, and with said core positioned in said first plate.

6. A cryotrap as defined in claim 5 wherein each of said first and second plates is of a low density, closed cell, rigid foam thermal insulation with a plurality of insulator openings therethrough, and metalized plastic film on each side of the plate.

7. A cryotrap as defined in claim 6 including crumpled metalized plastic film filling said insulator openings of said second plates.

8. A cryotrap as defined in claim 7 including a plurality of third insulator plates with at least one third plate on each side of the first and second plate combination, and a fourth mounting plate on a side of the first, second and third plate combination; and means for joining said plates in a sandwich construction;

with each of said third plates of a low density, closed cell, rigid foam thermal insulation and an metalized plastic film on each side of the plate; and with aligned expander openings through the second, third and fourth plates on one side of said first plate aligned with said core in said first plate for receiving said gas expander.

9. A cryotrap as defined in claim 8 wherein said insulator openings in adjacent plates are out of alignment with each other.

10. A cryotrap as defined in claim 9 wherein said plates are in the order of ½ inch thick and square and about 4 inches long on a side.

11. In a cryotrap for an air pollution analyzer, the combination of:

a core having a first opening for receiving a cooling gas expander and a helical groove around the exterior thereof;

a length of tubing carried on said core in said helical groove and defining a gas flow path around said gas expander;

an electric heater on said core, positioned around said core over said tubing;

a copper foil wrapped around said core over said heater; and a support for said core having a first central plate and a plurality of second insulator plates, with at least one second plate on each side of said first plate, and with said core positioned in said first plate, with each of said first and second plates of a low density, closed cell, rigid foam thermal insulation with a plurality of openings therethrough, and a metalized plastic film on each side of the plate, and with crumpled metalized plastic film filling said openings of said second plates.

12. A cryotrap as defined in claim 11 including a Stirling linear drive cooler charged with helium and having a gas compressor connected to one end of said gas expander with the other end of said expander positioned in said axial opening of said core.

13. A cryotrap as defined in claim 12 including a plurality of third insulator plates with at least one third plate on each side of the first and second plate combination, and a fourth mounting plate on a side of the first, second and third plate combination; and means for joining said plates in a sandwich construction;

with each of said third plates of a low density, closed cell, rigid foam thermal insulation and a metalized plastic film on each side of the plate; and with aligned openings through the second, third and fourth plates on one side of said first plate aligned with said axial opening of said first plate for receiving said gas expander.

* * * * *